US011381468B1

(12) United States Patent
Thompson et al.

(10) Patent No.: US 11,381,468 B1
(45) Date of Patent: Jul. 5, 2022

(54) IDENTIFYING CORRELATED RESOURCE BEHAVIORS FOR RESOURCE ALLOCATION

(71) Applicant: Amazon Technologies, Inc., Seattle, WA (US)

(72) Inventors: James Michael Thompson, Seattle, WA (US); Marc Stephen Olson, Bellevue, WA (US); Marc John Brooker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 577 days.

(21) Appl. No.: 14/658,941

(22) Filed: Mar. 16, 2015

(51) Int. Cl.
*H04L 41/147* (2022.01)
*H04L 67/101* (2022.01)
*H04L 67/1021* (2022.01)

(52) U.S. Cl.
CPC .......... *H04L 41/147* (2013.01); *H04L 67/101* (2013.01); *H04L 67/1021* (2013.01)

(58) Field of Classification Search
CPC ...... G06Q 50/22; G06Q 10/10; G06Q 19/324; G06F 19/322; G06F 19/345; G06F 2209/5021; G06F 2209/504; G06F 2209/507; G06F 3/1263; G06F 9/30076
See application file for complete search history.

(56) References Cited

U.S. PATENT DOCUMENTS

| | | | | |
|---|---|---|---|---|
| 7,356,583 B2* | 4/2008 | Palmer | ................... | G06Q 10/10 709/224 |
| 8,392,575 B1 | 3/2013 | Marr | | |
| 8,495,512 B1* | 7/2013 | Lappas | ................. | G06F 3/0619 715/764 |
| 8,582,584 B2* | 11/2013 | Rieger | .................. | H04L 47/822 370/401 |
| 8,713,179 B2* | 4/2014 | Dawson | ................ | G06F 9/5072 709/226 |

(Continued)

OTHER PUBLICATIONS

'Elements of artificial neural networks': Mehrotra, 1997, MIT Press.*

(Continued)

*Primary Examiner* — Li B. Zhen
*Assistant Examiner* — Peter D Coughlan
(74) *Attorney, Agent, or Firm* — Robert C. Kowert; Kowert, Hood, Munyon, Rankin & Goetzel, P.C.

(57) ABSTRACT

A distributed system may implement identifying correlated workloads for resource allocation. Resource data for resources hosted at resource hosts in a distributed system may be analyzed to determine behavioral similarities. Historical behavior data or resource configuration data, for instance, may be compared between resources. Behaviors between resources may be identified as correlated according to the determined behavioral similarities. An allocation of one or more resource hosts in the distributed system may be made for a resource based on the behaviors identified as correlated. For instance, resources may be migrated from a current resource host to another resource host, new resources may be placed at a resource host, or resources may be reconfigured into different resources. Machine learning techniques may be implemented to refine techniques for identifying correlated behaviors.

20 Claims, 8 Drawing Sheets

(56) References Cited

U.S. PATENT DOCUMENTS

| | | | |
|---|---|---|---|
| 2001/0032029 A1* | 10/2001 | Kauffman | G06Q 10/06 700/99 |
| 2003/0204619 A1* | 10/2003 | Bays | H04L 43/10 709/238 |
| 2005/0055694 A1* | 3/2005 | Lee | G06F 9/4881 718/100 |
| 2007/0107025 A1* | 5/2007 | Li | H04L 12/1854 725/97 |
| 2008/0271038 A1* | 10/2008 | Rolia | G06F 9/505 718/105 |
| 2009/0259769 A1* | 10/2009 | Lakshmanan | H04L 45/02 709/241 |
| 2010/0083248 A1 | 4/2010 | Wood et al. | |
| 2010/0149979 A1* | 6/2010 | Denecheau | H04L 43/0852 370/234 |
| 2011/0191461 A1 | 8/2011 | Dasgupta et al. | |
| 2011/0302578 A1 | 12/2011 | Isci et al. | |
| 2012/0054329 A1* | 3/2012 | Gulati | H04L 67/1002 709/224 |
| 2012/0284408 A1 | 11/2012 | Dutta et al. | |
| 2013/0054948 A1* | 2/2013 | Raj | G06F 9/45558 713/2 |
| 2013/0080641 A1* | 3/2013 | Lui | H04L 67/10 709/226 |
| 2013/0081043 A1* | 3/2013 | Glew | G06F 9/5027 718/104 |
| 2013/0097601 A1 | 4/2013 | Podvratnik et al. | |
| 2013/0304903 A1* | 11/2013 | Mick | H04L 43/0817 709/224 |
| 2013/0346614 A1* | 12/2013 | Baughman | G06F 9/5083 709/226 |
| 2015/0033305 A1* | 1/2015 | Shear | G06F 21/45 726/6 |

OTHER PUBLICATIONS

U.S. Appl. No. 14/643,906, filed Mar. 10, 2015, Christopher Magee Greenwood.
U.S. Appl. No. 14/642,445, filed Mar. 9, 2015, Marc John Brooker.
U.S. Appl. No. 14/643,479, filed Mar. 10, 2015, Christopher Magee Greenwood.

* cited by examiner

US 11,381,468 B1

IDENTIFYING CORRELATED RESOURCE BEHAVIORS FOR RESOURCE ALLOCATION

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide block-based storage, various different placement optimizations and/or constraints may be implemented in order to provide performance guarantees. When placing block-based storage resources amongst resource hosts, selecting from among different placement options that satisfy the optimizations and/or constraints to place storage may prove challenging.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement identifying correlated behaviors for resource allocation. Distributed systems may host various resources for performing or implementing different systems, services, applications and/or functions. Some resources may be part of a larger distributed resource, located at multiple resources amongst different resource hosts. Other resources may be individual or stand-alone. Resources may be one of many different types of resources, such as one of various types of physical or virtualized computing resources, storage resources, or networking resources. For example, a storage service may host different replicas of data across a number of different resource hosts.

Allocation decisions may be made to assign, distribute, configure, or otherwise determine the distribution of resources among resource hosts in distributed system. Typically, resources operate in independent or unrelated fashion, allowing for allocation techniques to make allocation decisions based on individual considerations of what is optimal for a particular resource. However, some resources may perform workloads or behaviors that are coordinated across multiple resources. For example, benchmarking multiple deployments of similar resources may operate in a coordinated manner. Such coordinated activities may strain resources hosts in a distributed system which may not be allocated to optimize performance of coordinated activities. Identifying correlated resource behaviors for resource allocation may allow allocation decisions to predict correlated behaviors among resources and make allocation decisions that better optimize and/or distributed resources among infrastructure units, such as resource hosts.

Figure 1:
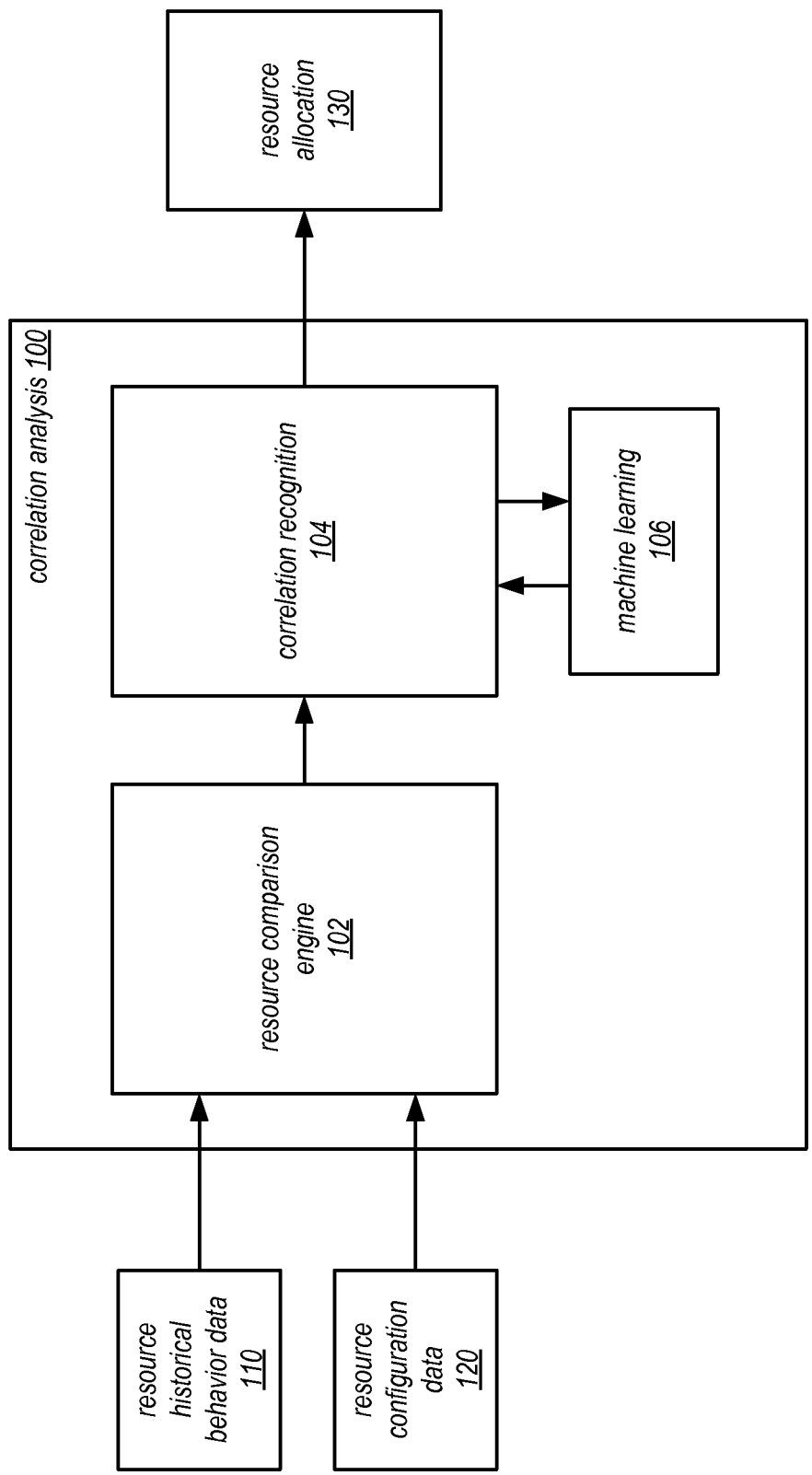
FIG. 1 illustrates a logical block diagram for identifying correlated resource behaviors for resource allocations, according to some embodiments.

FIG. 1 illustrates a logical block diagram for identifying correlated resource behaviors for resource allocations, according to some embodiments. Correlation analysis 100 may be implemented as part of a resource placement or allocation technique to account for coordinated or otherwise correlated behavior amongst resources in a distributed system. As illustrated in FIG. 1, correlation analysis 100 may be used as an input to resource allocation 130 which may make allocation decisions based on identified correlated behavior between resources. For example, allocation decisions may be made to avoid locating some resources together at resource hosts, or other infrastructure units. Generally, infrastructure units may be may be defined by devices, such as server racks, networking switches, routers, or other components, power sources (or other resource host suppliers), physical or geographical locations (e.g., locations in a particular row, room, building, data center, fault tolerant zone, etc.), logical groupings of devices (e.g., resource host pools that provide different types of resource), or individual resource hosts. Infrastructure units may vary in scope such that a resource host (and replicas of data volumes implemented on the resource host) may be within multiple different types of infrastructure units, such as a particular network router or brick, a particular room location, a particular site, etc. New resources may be placed at an infrastructure unit, such as a resource host or networking device connected resource hosts, based on resource allocation decision-making that is informed by identified correlated resource behaviors. Similarly, currently placed resources may be moved or migrated from one infrastructure unit to another according to allocation decisions informed by identified correlated resource behaviors.

Resource data for resources may be tracked, collected, obtained, stored, and/or monitored, in various embodiments. Resource comparison engine 102, which may be implemented as part of correlation analysis 100 may analyze resource data to determine behavioral similarities between resources. For example, as illustrate din FIG. 1, resource historical behavior data 110 may be utilized by resource comparison engine 102. Previous actions taken, changes in state, or other behavior data may be collected for particular time periods and compared with other resource historical behavior data to determine similarities between resources. Resource configuration data 120 may be utilized in some embodiments, by resource comparison engine 102 to compare the configuration of different resources. For example, resources with common software applications, platforms, or operating systems may be considered similar.

Resource comparison engine 102 may provide correlation recognition 104 with determined behavioral similarities. For instance, similarity scores may be generated and provided which indicate the similarity of two resources for a particular behavior or for behavior of the resources overall (e.g., similarity in number of storage operations, or similarity as a resource as whole). Correlation recognition 104 may identify correlated behaviors according to the determined behavioral similarities, in various embodiments. For example, similarity scores may be compared with a correlation threshold. If the score exceeds the threshold, then the behavior and the associated resources may be identified as having a correlated behavior. In some embodiments, correlation criteria may be implemented to evaluate multiple different similarities between resources. For instance, similarity scores may be weighted according to selectivity and combined, according to the correlation criteria. In at least some embodiments, machine learning 106 may be implemented to improve or adapt correlation criteria over time, such as in response to scarcity requirements from hardware owners.

Please note that previous descriptions are not intended to be limiting, but are merely provided as an example of identifying correlated resource behavior for resource allocation. Various components may perform resource allocation. Different numbers or types of data may be analyzed to identify correlated resource behaviors.

This specification begins with a general description of a provider network, which may implement identifying correlated resource behavior for resource allocation for resources offered via one or more network-based services in the provider network, such as identifying correlated behaviors of data volumes offered via a block-based storage service. Then various examples of a block-based storage service are discussed, including different components/modules, or arrangements of components/module that may be employed as part of volume placement for data volumes in the block-based storage service which may perform identifying correlated resource behavior for resource allocation. A number of different methods and techniques to implement identifying correlated resource behavior for resource allocation are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
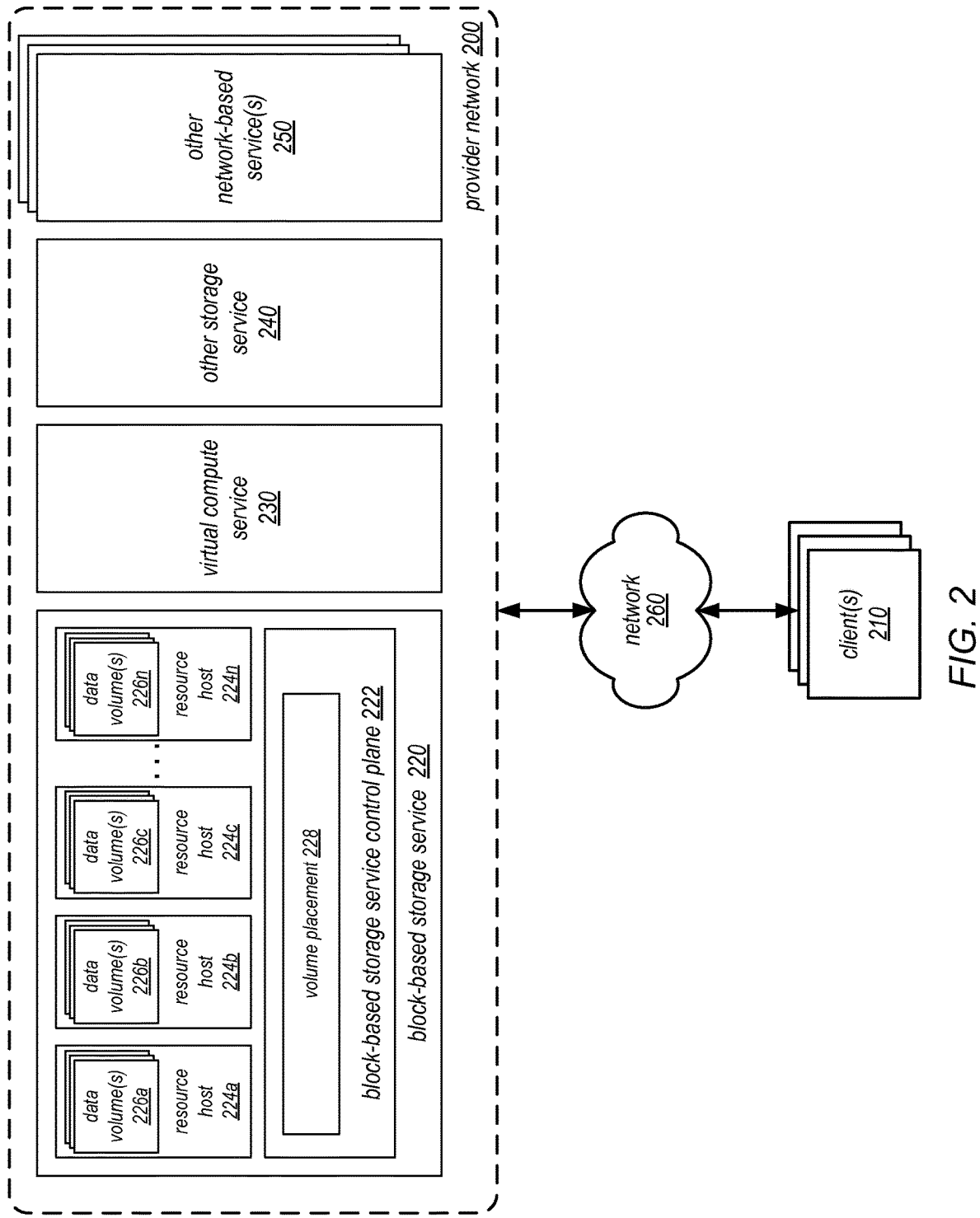
FIG. 2 is a block diagram illustrating a provider network that includes multiple network-based services such as a block-based storage service that implements identifying correlated resource behaviors for resource allocations, according to some embodiments.

FIG. 2 is a block diagram illustrating a provider network implementing multiple network-based services including a block-based storage service that implements identifying correlated resource behavior for resource allocation, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent resource hosts 224a, 224b, 224c through 224n(e.g., server block data storage systems), which provide block level storage for storing one or more sets of data volumes data volume(s) 226a, 226b, 226c, through 226n. Data volumes 226 may be mapped to particular client(s) (e.g., a virtual compute instance of virtual compute service 230), providing virtual block-based storage (e.g., hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service 240. Snapshot operations may be performed to send, copy, and/or otherwise preserve the snapshot of a given data volume in another storage location, such as a remote snapshot data store in other storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane may implement volume placement 228, such as described in further detail below with regard to FIG. 3. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
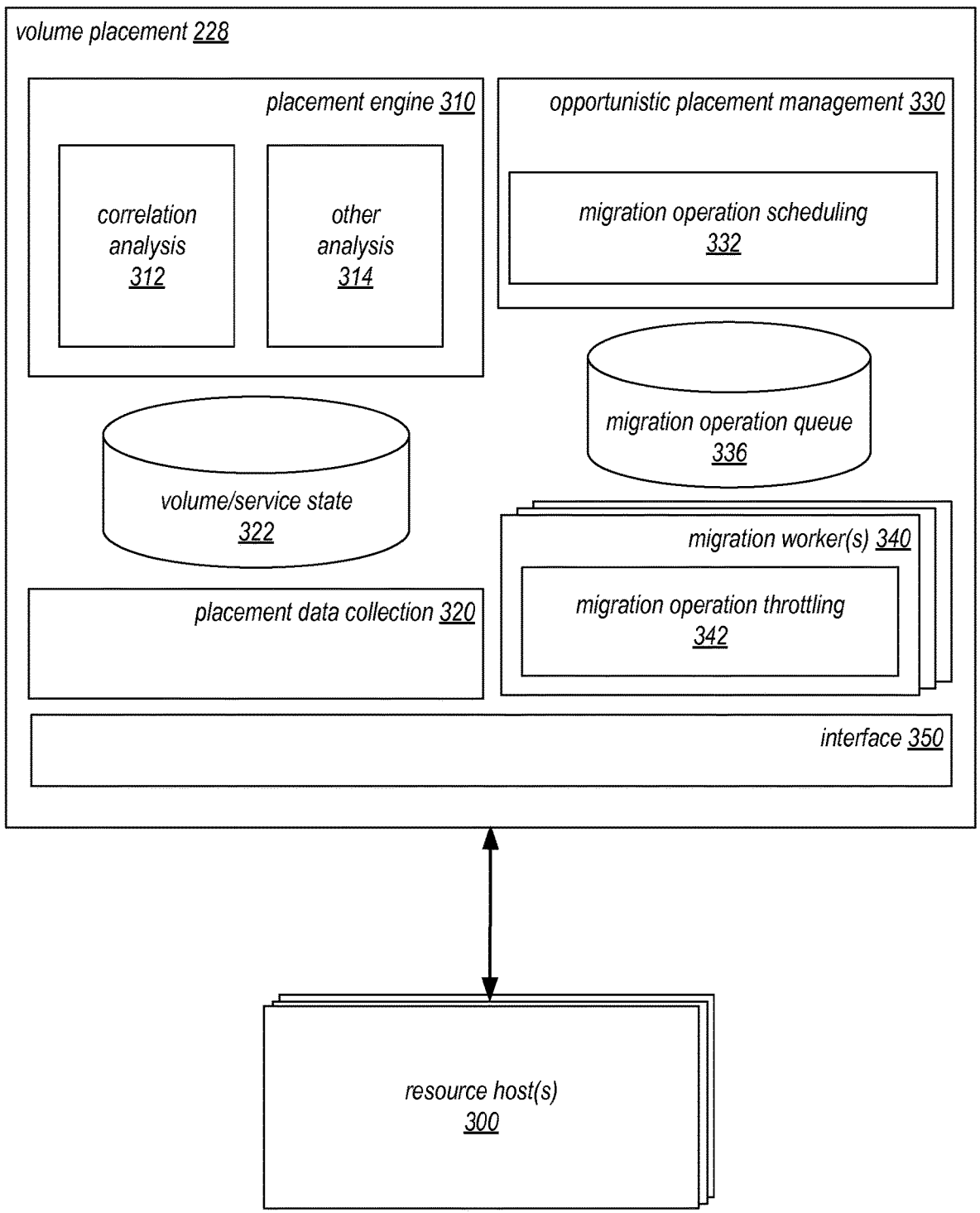
FIG. 3 is a logical block diagram illustrating volume placement that implements identifying correlated resource behaviors for resource allocations, according to some embodiments.

FIG. 3 is a logical block diagram illustrating volume placement that implements identifying correlated resource behavior for resource allocation, according to some embodiments. As noted above, multiple resource hosts, such as resource hosts 300, may be implemented in order to provide block-based storage services. A resource host may be one or more computing systems or devices, such as a storage server or other computing system (e.g., computing system 1000 described below with regard to FIG. 8). Each resource host may maintain respective replicas of data volumes. Some data volumes may differ in size from other data volumes, in some embodiments. Resource hosts may also provide multi-tenant storage. For example, in some embodiments, one resource host may maintain a data volume for one account of block-based storage service 220, while another data volume maintained at the same resource host may be maintained for a different account. Resource hosts may persist their respective data volumes in one or more block-based storage devices (e.g., hard disk drives, solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more resource hosts as a distributed resource maintaining a same replica of a data volume at different partitions of the data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, one resource host may serve as a master resource host. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as slave resource hosts. Thus, when a write request is received for the data volume at a master resource host, the master resource host may forward the write request to the slave resource host(s) and wait until the slave resource host(s) acknowledges the write request as complete before completing the write request at the master resource host. Master resource hosts may direct other operations for data volumes, like snapshot operations or other I/O operations (e.g., serving a read request).

Please note, that in some embodiments, the role of master and slave resource hosts may be assigned per data volume. For example, for a data volume maintained at one resource host, the resource host may serve as a master resource host. While for another data volume maintained at the same resource host, the resource host may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

Resource hosts may be located within and/or considered different infrastructure units. Infrastructure units may be defined by devices, such as server racks, networking switches, routers, or other components, power sources (or other resource host suppliers), physical or geographical locations (e.g., locations in a particular row, room, building, data center, fault tolerant zone, etc.), or logical groupings of devices (e.g., resource host pools that provide different types of resource). Infrastructure units may vary in scope such that a resource host (and replicas of data volumes implemented on the resource host) may be within multiple different types of infrastructure units, such as a particular network router or brick, a particular room location, a particular site, etc.

Block-based storage service control plane 222 may implement volume placement 228, in various embodiments. Volume placement 228 may be implemented at one or more computing nodes, systems, or devices (e.g., system 1000 in FIG. 8). In at least some embodiments, volume placement 228 may implement placement data collection 320 to collect information, metrics, metadata, or any other information for performing volume placement (e.g., collecting historical behavioral data and/or configuration data for resources). Placement data collection 320 may periodically sweep resource host(s) 300 with a query for the information, metrics, or metadata. For example, resource hosts may provide current utilization metrics, ongoing tasks or operations (e.g., such as migration or remirror tasks), and any other state information for the resource host, including resource specific information for resources residing at the resource hosts. In some embodiments, placement data collection 320 may aggregate the data according to infrastructure units, partitions, resource hosts, or other granularities for block-based storage service 220. Placement data collection 320 may store the data at volume/service state store 322, which may persistently maintain the collected data. In some embodiments volume/service state store 322 may be implemented as a database or otherwise searchable/query-able storage system to provide access to other components of volume placement 228 or block-based storage service control plane 226.

Volume placement 228 may implement placement engine 310, in various embodiments. Placement engine 310 may perform various kinds of analysis to identify placement locations for partitions of new data volumes or migrating data volumes. In response to receiving a placement request at placement engine 310, placement engine 310 may determine prospective placements by accessing volume/service state 322. Those resource hosts which are available, and which do not violate any placement constraints may be evaluated (e.g., two partitions of a data volume cannot be hosted by the same resource host, resource hosts with enough capacity, or resource hosts that implement particular hardware and/or software). In some embodiments, a subset of available resource hosts may be evaluated for placement decisions (as evaluating a very large pool of available resource hosts may be too computationally expensive).

Placement requests may be received to place a new resource, in some embodiments. Placement requests may also be received to move or migrate already hosted resources, such as discussed below with regard to opportunistic placement manager 330. In at least some embodiments, placement engine 310 may provide placement or reconfiguration recommendations for currently placed resources (e.g., to a user associated with resources).

Placement engine 310 may implement correlation analysis 312 to identify correlated resource behaviors. For example, correlation analysis 312 may access volume/service state 322 to obtain historical behavioral data for resources at resource host(s) 300 and perform comparisons. Similarly, correlation analysis 312 may access volume/service state 322 to compare configuration data (e.g., resource tags, or hardware or software configurations). Correlated behaviors of resources may be identified according to behavioral similarities and placement decisions may be made (possibly utilizing other additional analysis techniques in combination), such as the various techniques described below with respect to FIGS. 4-7. For example, placing resources on resource hosts with correlated behaviors may be avoided.

Placement engine 310 may implement other analysis 314 to determine resource placements. For example, scores may be generated for placements based on the last time a particular resource host was contacted or heard from. Analysis may be performed to prevent multiple master-slave replica pairs from being placed on the same two resource hosts. In some embodiments, resource host fragmentation analysis may be performed, to optimize placement of resources on resource hosts that can host the resource and leave the least amount of space underutilized. Other analysis 314 may implement configuration analysis to evaluate prospective placement configurations of all of the resources in a distributed resource, such as the placement of master, slave(s) of a data volume. In some embodiments, a client or other user of a distributed resource (or resource of the distributed resource) may be considered in the configuration analysis (e.g., evaluating the placement configuration including a virtual instance attached to a data volume). Prospective placement configurations may be generated or identified based on the available resource hosts for the resource. Other replicas of the data volume may be evaluated based on actual or hypothetical placement locations. One or more infrastructure zone localities may be determined for the different prospective placement configurations, in various embodiments, based on volume/service state 332.

In some embodiments, volume placement 228 may implement opportunistic placement manager 330. Opportunistic placement management 330 may dynamically or proactively migrate currently placed resources from one resource host to another resource host so that the placement for the data volume is more optimal. For example, opportunistic placement manager 330 may implement migration operation scheduling 332 to request placements for resources from placement engine 310 that are determined to be placed sub-optimally (e.g., a lower scoring infrastructure zone category). Migration operation scheduling 332 may then determine which placements if performed would exceed a migration optimization threshold (e.g., a difference between a current placement score and new placement score). For those resources with possible placements that would exceed the placement optimization threshold, migration operation scheduling 332 may place a migration operation for the partition in migration operation queue 336. In some embodiments, migration operation scheduling 332 may assign a priority to migration operations, so that more beneficial migration operations are performed sooner.

Migration operation scheduling 332 may also remove migration operations from queue 336, such as those migration operations identified as complete or failed. Those migration operations that have not yet been performed may have update priorities stored in the queue (e.g., raising or lowing the priority value). Time of last update may indicate when an update to the migration operation in the queue was last made. For example, a migration operation that has a later update time than other migration operations, may be considered to have more recent/relevant data. Priority values may be assigned to migration operations in order to schedule the migration operations opportunistically. In at least some embodiments, migration operation queue 336 may be implemented as a priority queue, and thus the highest priority migration operation may be selected for performance.

Migration worker(s) 340 may be implemented to perform migration operations. Migration worker(s) 340 may send a request to opportunistic placement manger 330 for a migration operation to perform. Opportunistic placement manger 330 may pull a migration operation from migration operation queue 336 and assign the migration operation to a migration worker 340 to direct. Alternatively, migration workers may directly access migration operation queue 336 to identify migration operations to perform, in some embodiments. Migration worker(s) 340 may, in some embodiments, update metadata for a migration operation in migration operation queue 336 (e.g., to change state from "ready" to "in progress").

In some embodiments, migration operation throttling 342 may be implemented to control the number of ongoing migration operations. Placement data collection 320 may track, maintain, or monitor current migration operations that are ongoing at resource host(s) 310, along with other data, such as network utilization, resource host utilization, or any other operational metrics and update volume/service state 322. Migration worker(s) 340 may access volume/service state 322 to determine whether a migration operation should be throttled according to some migration limit. For example, in some embodiments, network localities, which may include one or more resource host(s) 310, networking device(s), router(s), switches, power source(s), or other component or device of a virtual block-based storage service may be evaluated with respect to the effect of performing the identified resource migration operation. Different migration limits (e.g., number of migration operations, network utilization, resource host utilization, etc.) may be enforced with respect to the network localities. If the migration operation exceeds the limit for one of the different network localities, then the migration worker may throttle performance of the migration operation (e.g., the migration operation may be denied or delayed). In some embodiments, migration operation throttling may be limited to specific infrastructure zones or network localities (e.g., to the infrastructure zones or network localities which would be involved with perform a migration, such as zones that include the current and destination resource hosts of a migration operation). In some embodiments, opportunistic placement management 330 may perform migration operation throttling in addition to, or in place of migration worker(s) 340.

In various embodiments, migration worker 340 may request an updated placement for a resource that is to be migrated from placement engine 310, which may perform the various techniques discussed above and below to provide a new placement location for the resource.

Resources may be one of many different types of resources, such as one of various types of physical or virtualized computing resources, storage resources, or networking resources. Some resources may be part of a group of resources that make up a distributed resource. For example, a data volume of the block-based storage service described above with regard to FIGS. 2 and 3 may be a distributed resource that is implemented as a master replica and one or more replica slaves.

Figure 4:
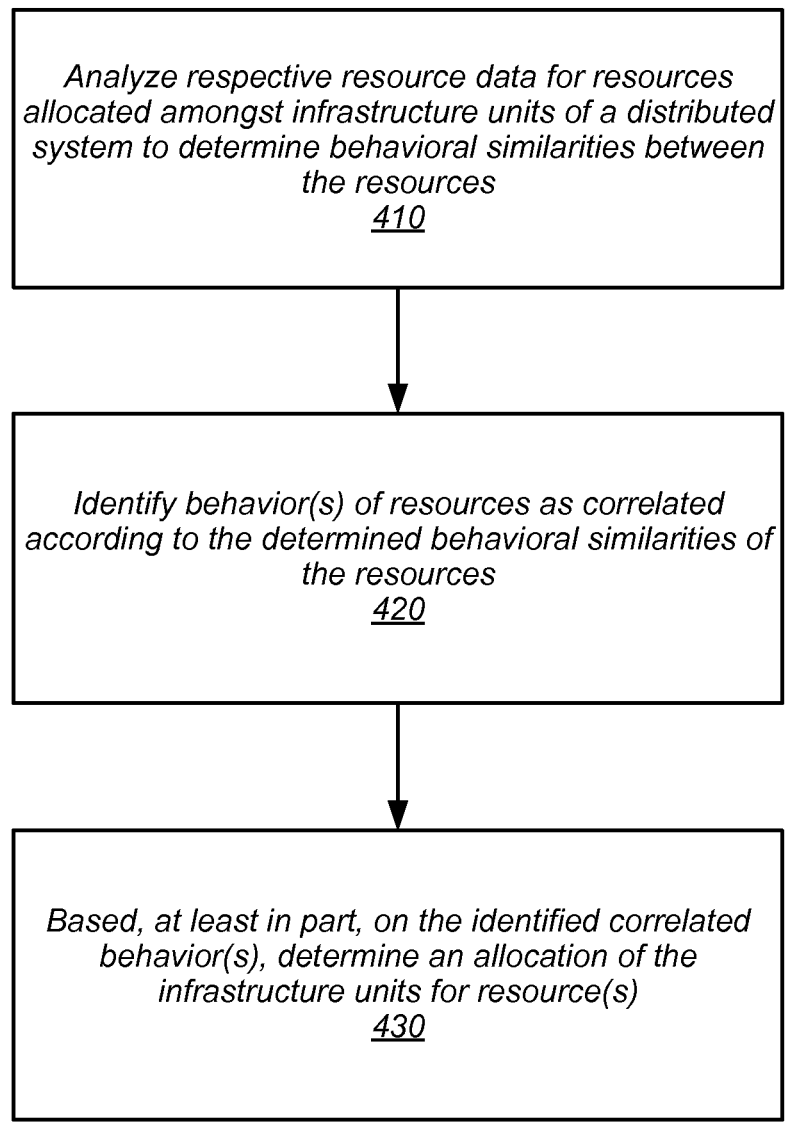
FIG. 4 is a high-level flowchart illustrating various methods and techniques for identifying correlated resource behaviors for resource allocations, according to some embodiments.

In some instances, the operations, functions, tasks, or otherwise behaviors of the resources of a distributed system may be implemented as part of coordinated, related, directed, or predetermined activities, resulting in an impact on a distributed system that is greater than the individual effects of behaviors exhibited by resources. For instance, different resources may be similarly configured to perform a backup operation at same or similar time of day, increasing the burden on those portions of the distributed system involved in the backup operation (e.g., back up storage servers). By predicting such correlated behaviors, allocation decisions for resources in a distributed system may be made so as to compensate for the impact of correlated behaviors. FIG. 4 is a high-level flowchart illustrating various methods and techniques for identifying correlated resource behaviors for resource allocations, according to some embodiments.

As indicated at 410, respective resource data for resources allocated amongst infrastructure units of a distributed system may be analyzed to determine behavioral similarities between the resources. Respective resource data may be resource data which is indicative of past, current, and/or future behavior(s) of a resource. For example, in a least some embodiments, actions, operations, performance, or utilization of a resource at a resource host or other infrastructure unit may be tracked and organized according to time (e.g., as a time series). In some embodiments, descriptive information about resources, such as configuration data may be collected or obtained, either from system generated sources (e.g., network configuration information) or user supplied sources (e.g., resource tags or attributes or hardware/software configurations). Resource data may be periodically (or aperiodically) updated, such as discussed above with regard to FIG. 3, in order to obtain a more current version or state of resources in the distributed system.

Figure 5:
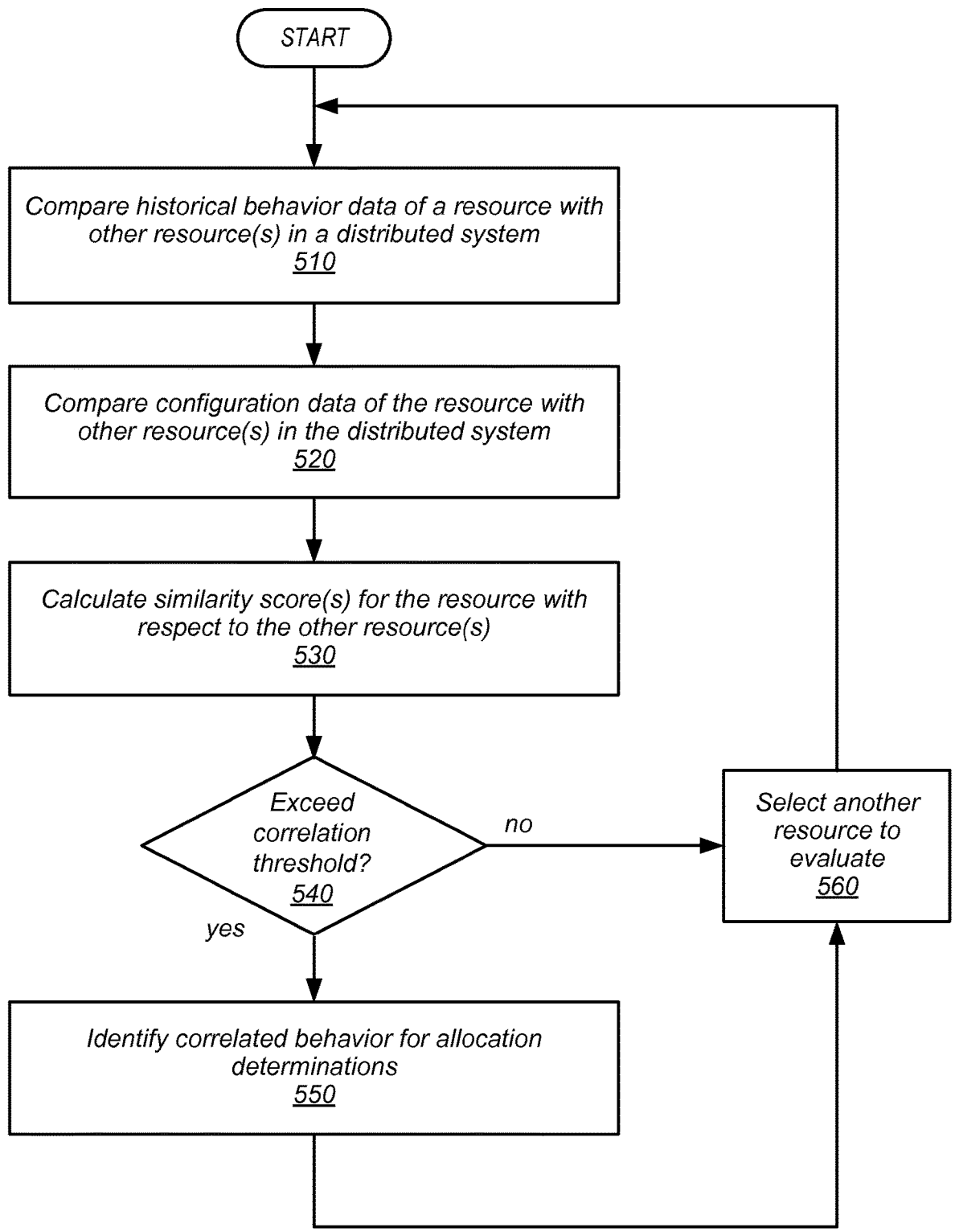
FIG. 5 is a high-level flowchart illustrating various methods and techniques for evaluating resource similarity to identify correlated behaviors between resources, according to some embodiments.

Analysis may be performed to determine behavioral similarities between different resources. Behavioral similarities may be a certain type of action, operation, or other behavior performed by (or with regard to) multiple resources in similar manner and/or time period. Behavioral similarity may be determined by recognizing common patterns, frequencies, or effects as a result of analyzing the resource data between different resources (e.g., common actions or common configuration which may determine actions). FIG. 5, discussed below, provides further examples of determining behavioral similarities. For example, similarity scores, or other indicators of similarity, may be calculated for different resources with respect to other resources. In some embodiments, as discussed below with regard to FIG. 7, a prediction of behavioral similarities (e.g., for a new resource which has not historical behavioral data) may be performed.

As indicated at 420, behaviors of resources may be identified as correlated according to the determined behavioral similarities of the resources, in some embodiments. For example, if two different resources, such as two different compute instances, perform the same computational task at the same or similar time once in a given time period (e.g., a hour, day, or week), then the behavioral similarity may be identified as correlated. Consider the scenario where multiple different compute instances perform analysis on purchase data for the previous 24 hour period at similar time (e.g., daily at 01:00:00). The different compute instances may exhibit similar processor demands to perform the various computational actions associated with the analysis and make similar storage demands to access the data under analysis. These determined behavioral similarities may be recognized (as discussed above at element 410) as sufficient to identify the similar behavior of the compute instances as correlated based on the similarities between processing load and storage access load. Note, the term correlated as used herein may be a quantitative term, and thus behaviors may be more or less correlated than other behaviors. Behaviors that are identified as "correlated" may be correlated with respect to particular degree, amount, or threshold of correlation. In at least some embodiments, correlation criteria may be implemented or applied to identify correlated behaviors. For example, correlation criteria may implement a weighting schema which provides maps different behavioral similarities to different correlation weights. If, for instance, two resources perform a similar task at similar times, but have different hardware configurations, then the weighting schema may determine that correlation between the two resources is lower than if the hardware configurations were the same (e.g., valuing common hardware configurations). As discussed below with regard to FIG. 6, machine learning techniques may be applied to identify correlated behaviors, for instance, by updating, modifying, or changing correlation criteria.

As indicated at 430, based, at least in part, on the identified correlated behavior(s), an allocation of the infrastructure units for resource(s) may be determined. For example, in some embodiments, it may be desirable to move or migrate a resource from one infrastructure unit to another (e.g., as discussed above with regard to FIG. 3 in order to optimize placement or allocation of resources amongst resource hosts). Moving resources from one networking device to another, for instance, may be performed to allocate resource hosts amongst networking devices of a distributed system. In some embodiments, migration of the resource may be performed by directing a current resource host to transfer the resource to the destination resource host. An intermediary, such as worker(s) 340 in FIG. 3 may direct and/or receive the resource before sending the resource to the destination resource host, in at least some embodiments. A failure scenario may trigger the migration of currently placed resources from one resource host to another, for instance. Allocation of resources may be placement decisions made to determine new or destination infrastructure unit, such as a resource host, for migrated resources. In some embodiments, multiple infrastructure units may be selected for placing a resource host, such as a particular network router and a particular resource host connected to the particular network router. In some instances, it may be optimal to ensure that resources with a correlated behavior are located at separate infrastructure units. Placement decisions may eliminate from possible destination infrastructure units those infrastructure units that already include a resource with an identified correlated behavior. Migration of resources may occur as a result of a manual or user generated request to migrate a resource, an automated or dynamic migration technique, as discussed above, and/or in response to particular events, such as certain failure scenarios.

Allocation of infrastructure units for resource(s) may also be performed to allocate infrastructure units for a new resource. For example, a request to place a new resource may be received. Placement of the new resource may be made so as to avoid placing the new resource within infrastructure units that are impacted by correlated behaviors of other resources. In some embodiments, as discussed below with regard to FIG. 7, a prediction may be made as to possible correlated behaviors of the new resource with respect to other resources.

In at least some embodiments, allocation decisions for resources may provide a recommendation to reconfigure resources with correlated behavior as a different resource or resources. For example, if multiple resources have correlated data processing behaviors, a recommendation may be made to reconfigure the multiple resources as a single resource on a different resource host with greater processing capability. Similarly, multiple resources can be further divided into more resources. In some embodiments, recommendations (and operations to implement the recommendation) may modify the behavior of one or more of the multiple resources so that the behaviors are less (or no longer) correlated. Please note that the previous examples illustrate some of the many different ways in which the identity of correlated resource behaviors may be used to allocate resources amongst resource hosts, and thus the previous examples are not intended to be limiting.

As noted above, behavioral similarities may be determined by analyzing resource data specific to the resources of a distributed system. Such analyses may be performed as part of a placement engine, workflow or other technique to allocate resources as the need to allocate resources is detected (e.g., via a request), or may be performed to generate a model or other data structure which can be later used to identify correlated behaviors of resources, such as discussed above with regard to element 420 of FIG. 4. FIG. 5 is a high-level flowchart illustrating various methods and techniques for evaluating resource similarity to identify correlated behaviors between resources, according to some embodiments.

As indicated, at 510, historical behavior data of a resource may be compared with other resource(s) in a distributed system, in some embodiments. Historical behavior data may indicate any action, change, or utilization to implement, operate, or perform the resource. For instance, utilization of a processor by a resource, such as a data volume (e.g., for providing read or write access to data) or virtual compute instance (e.g., for performing different calculations as part of an application), may be tracked or collected over time as historical behavior data for a resource. Network utilization (e.g., number of data packets sent or received), storage utilization (e.g., number of bytes stored), or any other utilization (e.g., system memory utilization) may indicate the behavior of a resource. Behavior data may also be tracked based on the type or classification of actions performed. For example, the number and/or types of different API requests made by a resource or received at a resource may be tracked.

Historical behavior data may be represented and/or evaluated in different ways. For example, time series data for a resource may be obtained with respect to a particular action, state, or other information (e.g., on/off or active/inactive). The time series data of the resource and other resources may be compared. For instance, the number of times at which the action, state, or other information match or agree may be calculated. Processor utilization, for instance, may be compared for similar workload patterns. In another example, actions, state, or other information in historical behavior data may be plotted as a vector for the different resources, and vector comparison techniques (e.g., cosine similarity) may be performed to compare the resource with other resources. Please note, that in some embodiments, a subset of the larger number of resources may be selected for this and other evaluations discussed below, in some embodiments, in order to reduce the workload (e.g., computational cost) to make the respective comparisons.

As indicated at 520, configuration data of the resource may be compared with the other resource(s) in the distributed system, in some embodiments. For example, resource attributes or tags, hardware/software configuration information (e.g., processor type, amount of system memory, graphics processor, magnetic or solid state storage technology, operating system, software applications, device drivers, etc.), or other description information of a resource (or resource host) may be compared. Some configuration data may always be known for a resource, as it may constitute a hard constraint for placing the resource that must be satisfied. Such configuration data may, in some embodiments, be given more weight in a similarity analysis. Other resource configuration data may be optional, or only possibly known. User-defined resource attributes, such as resource tags, may provide optional or additional data or sets of data which may be used in a comparison analysis. Such configuration data may, in some embodiments, be given less weight than hard constraint configuration data. Configuration data may be used to identify behavioral similarities. Consider the scenario where two resources are implementing the same analytics application. A comparison of the two resources may recognize this common configuration. In another example, two (or more) resources tagged as "backup" or "production" may be recognized by comparing configuration data.

Similarity score(s) for the resource with respect to the other resource(s) may be calculated, as indicated at 530, in various embodiments. For example, separate similarity scores may be generated with respect to one or more different portions of historical behavior data (e.g., score for write operations, score for read operations, score for requests processed, or score for requests sent) and configuration data (e.g., software similarity score, hardware similarity score, or resource tag similarity score). In some examples, historical behavior data and configuration data may both either increase or decrease the similarity score, depending upon the data. These scores may then be transformed or combined to create an overall similarity score for a resource with respect to another resource (e.g., resource A is 47/100 similar to resource B, 95/100 similar to resource C, and so on). In at least some embodiments, however, similarity scores may be considered separately.

If the similarity score(s) with other resource(s) exceed a correlation threshold, as indicated by the positive exit from 540, then correlated behavior may be identified for allocation determinations (as discussed above with regard to element 430 of FIG. 4). Correlated behavior between two or more resources may be specific or general, in various embodiments. For example, I/O throughput behavior for different resources may be identified as correlated, whereas other behaviors of the same resources may not be considered correlated. Correlation thresholds, in such a scenario, may be different for the specific behaviors for which correlation is determined (e.g., correlation threshold for I/O throughput and a separate correlation threshold for configuration data, such as matching 3 of 4 tags). Alternatively, resources may be generally identified as correlated (or not correlated) with one another. For instance, in at least some embodiments, correlation criteria may be implemented to provide selection rules, weightings, or some other schema which may be used to identify correlated behavior between resources (and behavior that is not correlated).

Once correlated behavior is identified, or if no correlated behavior is identified as indicated by the negative exit from 540, then another resource may be selected to evaluate, as indicated at 560, in some embodiments. For instance, the technique illustrated in FIG. 5 may be used to construct and/or update a correlation model, which indicates the identified correlated behaviors of resources in a distributed system.

Figure 6:
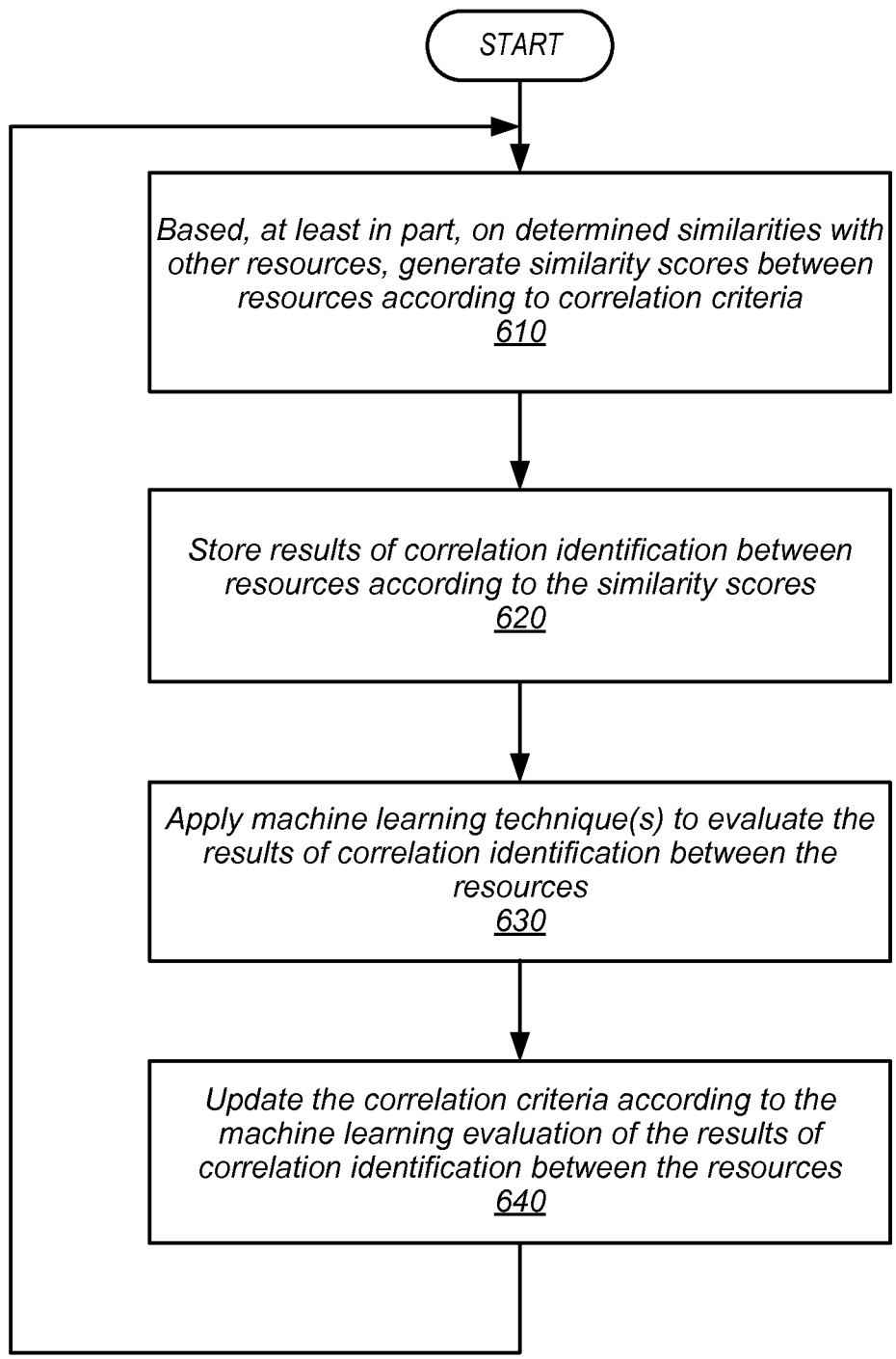
FIG. 6 is a high-level flowchart illustrating various methods and techniques for applying machine learning to update correlated resource behavior identification, according to some embodiments.

As identification of correlated behavior is performed over time, improvements may be made to identification techniques, such as those discussed above. Some behavioral similarities may become more selective or indicative of correlated behavior, while other behavioral similarities may become less so. For systems that perform identifying correlated resource behavior for resource allocation, adaptations to account for these changes in selectivity may increase the effectiveness of allocation decisions made. FIG. 6 is a high-level flowchart illustrating various methods and techniques for applying machine learning to update correlated resource behavior identification, according to some embodiments.

As indicated at 610, in at least some embodiments, based, at least in part, on determined similarities with other resources, similarity scores may be generated between resources according to correlation criteria—such as the similarity scores generated with respect to historical behavior data and configuration data. As indicated at 620, results of the correlation identifications made according to these similarity scores may be stored, in some embodiments. For instance, a database or other structured data store may be used to persistently store generated scores and identified behaviors based on the scores.

As indicated at 630, machine learning technique(s) may be applied to evaluate the stored results of correlation identification between the resources, in some embodiments. A feature selection algorithm may be implemented to determine if current correlation criteria should be modified, updated, and/or replaced which would increase the accuracy of correlated behavior identifications (e.g., minimize the error of false negatives). Pattern recognition, such as different classification or clustering techniques may be implemented to determine appropriate weights for different correlation criteria (e.g., increase or decrease weight of tag similarity vs. action similarity). As many other machine learning techniques may be implemented, the previous examples are not intended to be limiting.

The results of machine learning evaluations may be used to alter how correlated behaviors are identified. For example, as indicated at 640, the correlation criteria may be updated according to the machine learning evaluation of the results of correlation identification between the resources, in some embodiments. Weights may be changed, new similarities evaluated, or other changes to the way in which correlated behaviors are identified may be made. Applying the techniques discussed above with regard to FIG. 6 may allow correlated behavior identification to keep up with changing patterns or new correlated behaviors that would not be recognized without applying machine learning techniques.

Figure 7:
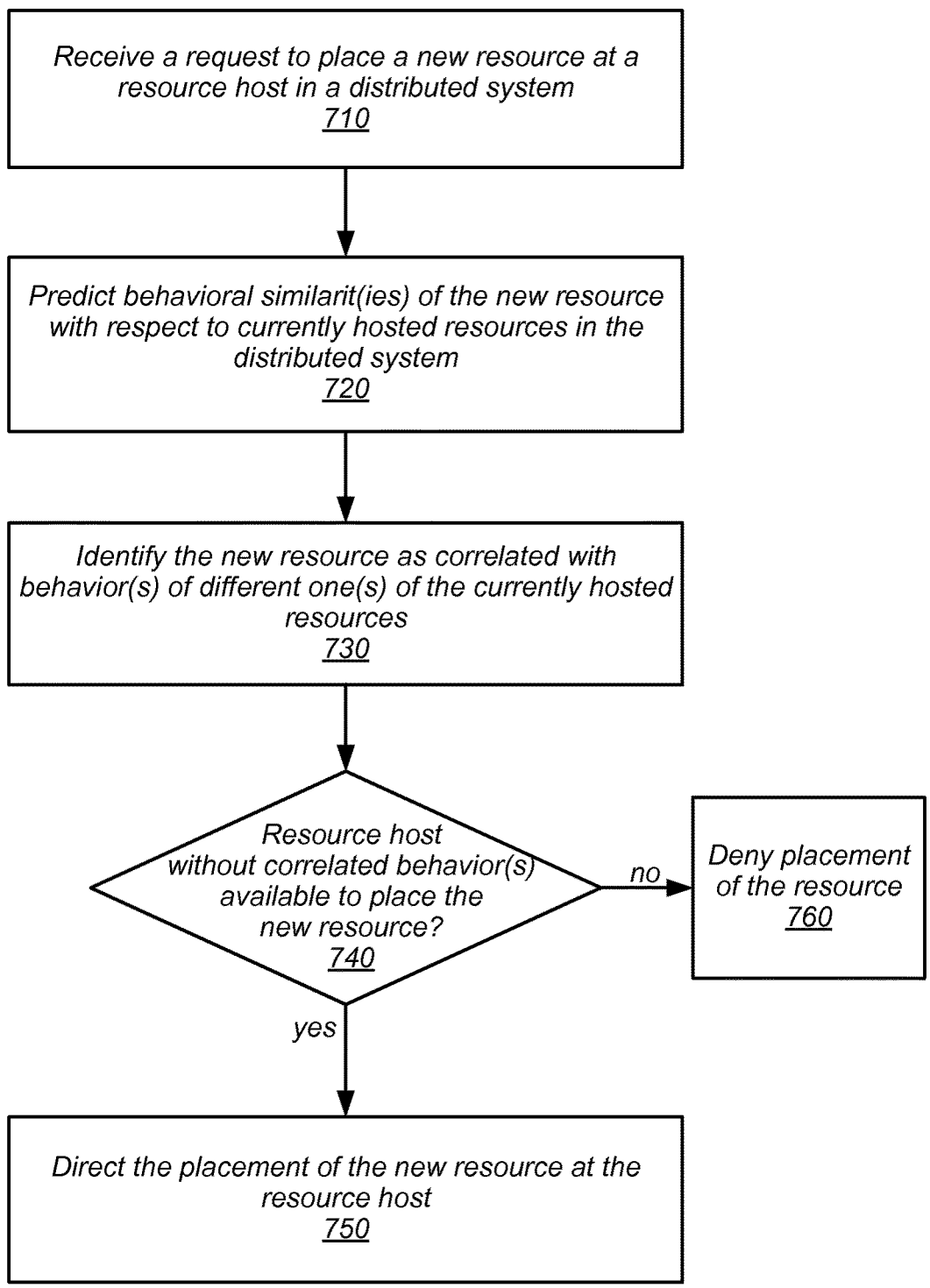
FIG. 7 is a high-level flowchart illustrating various methods and techniques for predicting behavioral similarities of resources to predict correlated behavior of new resources, according to some embodiments.

In some scenarios, a new resource may be placed for which no specific historical behavioral data is available. Other resource data, such as configuration data, may be available, however. Thus, in some scenarios, correlated behavior may be predicted for resources that have not yet been allocated in a distributed system. FIG. 7 is a high-level flowchart illustrating various methods and techniques for predicting behavioral similarities of resources to predict correlated behavior of new resources, according to some embodiments.

As indicated at 710, a request to place a new resource at a resource host in a distributed system may be received. The request may include data that describes the resource to be placed, such as desired hardware, software, location or association with other resources (e.g., a virtual compute instance to which the data volume resource is attached), and/or resource tag(s). In other words, configuration data for the new resource may be obtained.

As indicated at 720, in some embodiments, behavioral similarit(ies) of the new resource may be predicted with respect to currently hosted resources in the distributed system, in some embodiments. For example, configuration data comparisons may be made with other resources (e.g., the new resource may be tagged as "production" and "user data", and other currently placed resources tagged as "production" and "user data" may be recognized). In some embodiments, the source of the request (e.g., user or client) may be used to predict behavioral similarities. As indicated at 730, the new resource may be identified as correlated with behaviors of different one(s) of the currently hosted resource(s), in some embodiments. Similar to the identification techniques discussed above with regard to FIGS. 4 and 5, similarity scores may be generated, thresholds evaluated, and/or correlation criteria applied to identify correlated behavior(s).

Based, at least in part, on the identified correlated behavior(s), a selection of the resource host to place the new resource may be made, in some embodiments. For instance, resource hosts that host a resource with a correlated behavior may not be considered and/or selected to place the new resource (or alternatively on those resource hosts with resources that have correlated behavior(s) may be selected). As illustrated at 740, for example, if a resource host without correlated behavior(s) is available, then the resource may be placed at that resource host. On the other hand, if no correlated behavior(s) are determined, then there may be more options for resource hosts at which to place the new resource. Once identified, as indicated at 750, placement of the new resource at the resource host may be performed. For example, data may be written or copied to the selected resource host, an operation to configure and/or instantiate the new resource at the resource host may be performed, and/or other operations, such as migration of a resource off of the selected resource host, may be performed. If no resource hosts without correlated behavior(s) are available, as indicated at 760, then the placement request may be denied. Alternatively, in some embodiments, the placement of the resource may be made at a resource host with correlated behavior(s) based on other placement criteria. Please note, that various different schemes to place resources with or apart from other resources with correlated behaviors may be implemented, and thus the previous example is not intended to be limiting.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Figure 8:
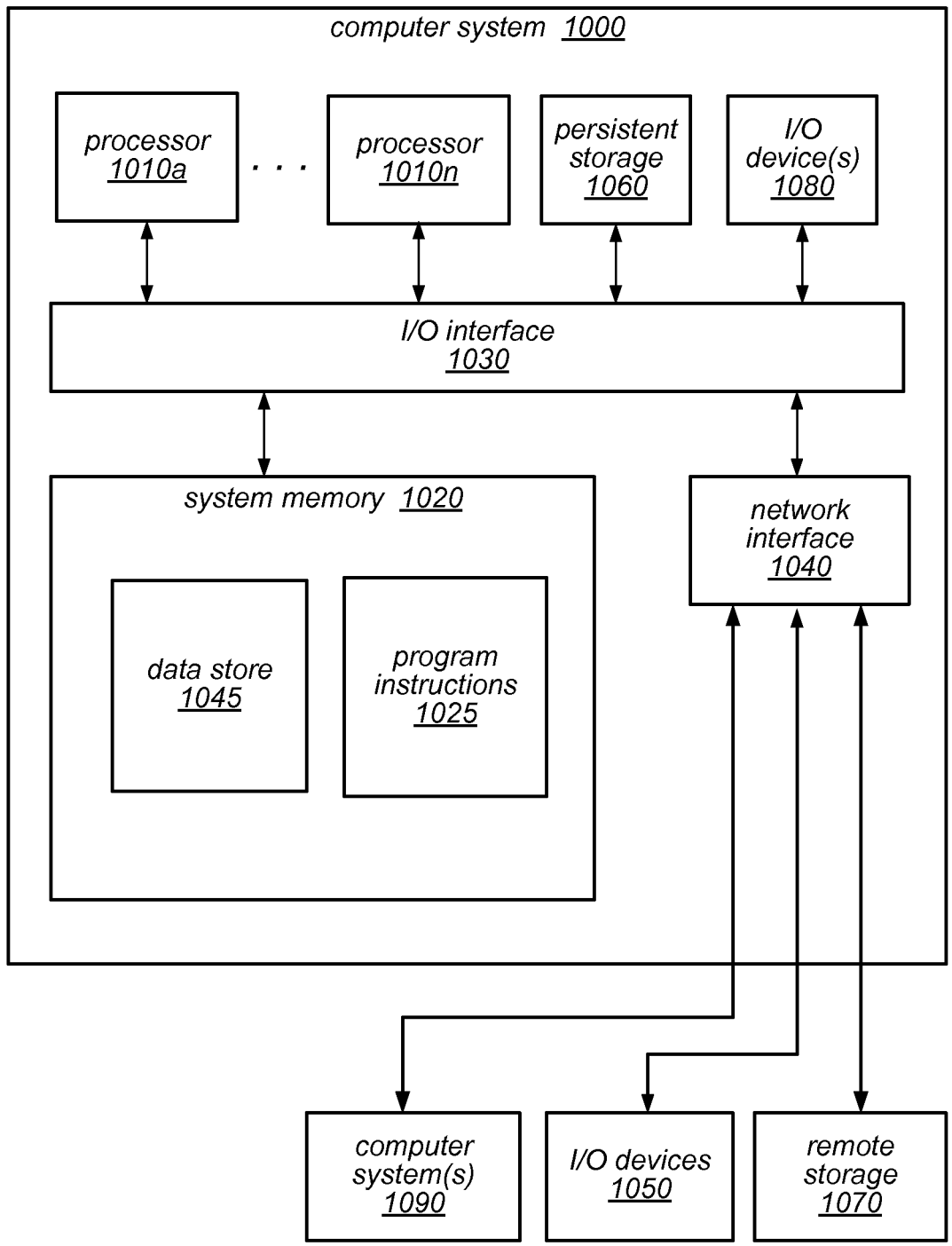
FIG. 8 is a block diagram illustrating an example computing system, according to some embodiments.

Embodiments of identifying correlated resource behaviors for resource placement as described herein may be executed on one or more computer systems, which may interact with various other devices. FIG. 8 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of resource hosts of a provider network, the plurality of resource hosts comprising respective hardware processors and memory, configured to host a plurality of resources of the provider network, wherein the resources comprise computing resources, storage resources, or networking resources;

one or more compute nodes comprising respective hardware processors and memory that implement a resource placement engine, configured to:

access respective historical behavioral data pertaining to prior usage of the plurality of resources hosted at one or more of the plurality of resource hosts;

evaluate the respective historical behavioral data to determine one or more historical behavioral similarities between respective ones of the plurality of resources;

identify two or more resources of the plurality of resources of the provider network as having one or more correlated resource behaviors based, at least in part, on the determined one or more historical behavioral similarities, such that the one or more correlated resource behaviors of the two or more resources share one or more patterns, frequencies, or effects in common with one another based at least in part on the two or more resources' respective historical behavior data pertaining to prior usage, wherein the two or more resources are computing resources, storage resources, or networking resources, wherein a first resource of the two or more resources is hosted on a first resource host of the plurality of resource hosts, and wherein a second resource of the two or more resources is hosted on a second resource host of the plurality of resource hosts;

store an identification the two or more resources of the provider network having the one or more correlated resource behaviors;

based, at least in part, on the stored identification of the two or more resources having the one or more correlated resource behaviors, generate a placement decision to place at least the first resource at a third resource host of the plurality of resource hosts that is different than the first or second resource hosts, wherein the placement decision of the first resource takes into account a placement at the second resource host of the second resource whose one or more resource behaviors are correlated with the one or more resource behaviors of the first resource; and based, at least in part, on the placement decision, place the first resource at the third resource host, such that the first resource is accessible via the provider network.

2. The system of claim 1, wherein to generate the placement decision to place the at least first resource at the third resource host of the plurality of resource hosts, the resource placement engine is configured to select a destination host from the plurality of resource hosts to migrate the first resource from a current resource host of the first resource.

3. The system of claim 1, wherein to evaluate the respective historical behavioral data to identify the one or more resource behaviors of the two or more resources of the plurality of resources as correlated, the resource placement engine is configured to apply one or more machine learning techniques to the one or more historical behavioral similarities.

4. The system of claim 1, wherein the provider network comprises a virtual block-based storage service, and wherein the plurality of resources are data volumes maintained for a plurality of clients of the virtual block-based storage service.

5. A method, comprising:
performing, by one or more computing devices comprising respective hardware processors and memory:

analyzing respective resource data for a plurality of resources of a provider network, comprising computing resources, storage resources, or networking resources, allocated amongst a plurality of infrastructure units of the provider network to determine one or more behavioral similarities between respective ones of the plurality of resources;

identifying two or more resources of the plurality of resources of the provider network as having one or more correlated resource behaviors based at least in part on the determined one or more behavioral similarities, such that the one or more correlated resource behaviors of the two or more resources of the provider network share one or more patterns, frequencies, or effects in common with one another based at least in part on the two or more resources' respective resource data, wherein the two or more resources are computing resources, storage resources, or networking resources, and wherein the two or more resources comprise a first resource and a second resource;

storing an identification of the two or more resources of the provider network having the one or more correlated resource behaviors;

based, at least in part, on the stored identification of the two or more resources having the one or more correlated resource behaviors, determining an alternate allocation of the infrastructure units for at least the first resource that is different from a current allocation of infrastructure units for the first resource, wherein determining the alternate allocation of the infrastructure units for the first resource takes into account a different allocation of the infrastructure units for the second resource whose one or more resource behaviors are correlated with the one or more resource behaviors of the first resource; and based, at least in part, on the determined alternate allocation of the infrastructure units for at least the first resource, allocating the infrastructure units for at least the first resource, such that the first resource is accessible via the provider network.

6. The method of claim 5, wherein the respective resource data comprises historical behavior data for the resource, and wherein analyzing the respective resource data for the plurality of resources allocated amongst the infrastructure units comprises comparing the historical behavior data of the plurality of resources.

7. The method of claim 5, wherein the respective resource data comprises configuration data for the resource, and wherein analyzing the respective resource data for the plurality of resources allocated amongst the infrastructure units comprises comparing the configuration data of the plurality of resources.

8. The method of claim 7, wherein the configuration data comprises at least one user-defined resource attribute.

9. The method of claim 5, wherein the infrastructure units are a plurality of networking devices, and wherein the first resource of the two or more resources is a new resource to be hosted at a resource host connected to one of the networking devices, wherein determining the alternate allocation of the infrastructure units for the first resource of the two or more resources comprises:

selecting the networking device and the resource host; and
wherein allocating the infrastructure units for the at least first resource of the two or more resources comprises:
placing the at least first resource at the resource host.

10. The method of claim 5, wherein the at least first resource of the two or more resources is at least two resources of the two or more resources with the identified one or more correlated resource behaviors and wherein determining the alternate allocation of the infrastructure units for the at least first resource comprises:
determining that the at least two resources are a logical grouping of resources; and
generating a recommendation to configure the at least two resources as a different one or more resources hosted at the infrastructure units.

11. The method of claim 5, wherein the infrastructure units are a plurality of resource hosts, and wherein determining the alternate allocation of the infrastructure units for the at least first resource comprises selecting a destination host from the resource hosts to migrate the at least first resource.

12. The method of claim 5, wherein identifying the two or more resources as having one or more correlated resource behaviors comprises applying one or more machine learning techniques to the one or more behavioral similarities between the resources.

13. The method of claim 5, wherein the provider network comprises a network-based service, and wherein the resources are maintained for a plurality of clients of the network-based service.

14. A non-transitory, computer-readable storage medium, storing program instructions that when executed by one or more computing devices cause the one or more computing devices to implement:
analyzing respective resource historical behavior data or respective resource configuration data for a plurality of resources of a provider network, comprising computing resources, storage resources, or networking resources, allocated amongst a plurality of infrastructure units of the provider network to determine one or more behavioral similarities between respective ones of the plurality of resources;
identifying of two or more resources of the plurality of resources of the provider network as having one or more correlated resource behaviors based at least in part on the determined one or more behavioral similarities, such that the one or more correlated resource behaviors of the two or more resources share one or more patterns, frequencies, or effects in common with one another based at least in part on the two or more resources' respective resource data, wherein the two or more resources are computing resources, storage resources, or networking resources, and wherein the two or more resources comprise a first resource and a second resource;
storing an identification of the two or more resources of the provider network having the one or more correlated resource behaviors;
based, at least in part, on the stored identification of the two or more resources having the one or more correlated resource behaviors, generating an alternate allocation decision for at least the first resource amongst the infrastructure units that is different than a current allocation decision for the first resource, wherein generating the alternate allocation decision for the first resource takes into account a different allocation decision for the second resource whose one or more resource behaviors are correlated with the one or more resource behaviors of the first resource; and
based, at least in part, on the generated alternate allocation decision for at least the first resource, allocating at least the first resource amongst the infrastructure units, such that the first resource is accessible via the provider network.

15. The non-transitory, computer-readable storage medium of claim 14, wherein the analyzing comprises analyzing respective resource historical behavior data only, and wherein, in analyzing the respective resource historical behavior data for the plurality of resources allocated amongst the infrastructure units, the one or more computing devices implement comparing the historical behavior data of the plurality of resources.

16. The non-transitory, computer-readable storage medium of claim 15, wherein the historical behavior data comprises time series data for the resource.

17. The non-transitory, computer-readable storage medium of claim 14, wherein the infrastructure units are different logical groupings of resource hosts, wherein, in generating the alternate allocation decision for the first resource amongst the infrastructure units, the one or more computing devices implement:
selecting a destination host from a logical group of resource hosts to migrate first resource from a current resource host of another logical grouping of resource hosts; and
wherein, in allocating the first resource of the two or more resources amongst the infrastructure units, the one or more computing devices implement:
directing a migration of the first resource from the current resource host to the destination resource host.

18. The non-transitory, computer-readable storage medium of claim 14, wherein the program instructions cause the one or more computing devices to further implement:
predicting one or more behavioral similarities of a new resource to be hosted at one of the infrastructure units with respect to different ones of the plurality of resources;
identifying the new resource as correlated with one or more behaviors of at least one of the different ones of the plurality of resources according to the predicted one or more behavioral similarities of the new resource;
based, at least in part, on the identified correlation of the new resource, selecting one of the infrastructure units to place the new resource; and
directing the placement of the new resource at the selected infrastructure unit.

19. The non-transitory, computer-readable storage medium of claim 14,
wherein the program instructions cause the one or more computing devices to further implement:
applying one or more machine learning techniques to evaluate previously performed correlation identifications;
based, at least in part, on the evaluation of the previously performed correlation identifications, update correlation criteria for identifying correlation between resource behaviors;
wherein the updated correlation criteria is applied for the identifying the one or more resource behaviors of two or more resources as correlated.

20. The non-transitory, computer-readable storage medium of claim 14, wherein the provider network comprises a virtual computing service, and wherein the plurality of resources are a plurality of virtual computing resources implemented for clients of the virtual computing service.

* * * * *